US008972368B1

United States Patent
de Sousa

(10) Patent No.: US 8,972,368 B1
(45) Date of Patent: Mar. 3, 2015

(54) SYSTEMS, METHODS, AND COMPUTER-READABLE MEDIA FOR PROVIDING SEARCH RESULTS HAVING CONTACTS FROM A USER'S SOCIAL GRAPH

(71) Applicant: Google Inc., Mountain View, CA (US)

(72) Inventor: David Reis de Sousa, Belo Horizonte (BR)

(73) Assignee: Google Inc., Mountain View, CA (US)

( * ) Notice: Subject to any disclaimer, the term of this patent is extended or adjusted under 35 U.S.C. 154(b) by 62 days.

(21) Appl. No.: 13/708,565

(22) Filed: Dec. 7, 2012

(51) Int. Cl.
*G06F 17/30* (2006.01)

(52) U.S. Cl.
CPC ................ *G06F 17/30477* (2013.01)
USPC .......................... 707/705; 707/706

(58) Field of Classification Search
CPC .................. G01C 21/3679; G06F 17/3087
USPC .................................. 707/705, 706
See application file for complete search history.

(56) References Cited

U.S. PATENT DOCUMENTS

| | | | |
|---|---|---|---|
| 8,010,418 B1 | 8/2011 | Lee | |
| 8,014,943 B2 * | 9/2011 | Jakobson | 701/439 |
| 8,221,999 B2 * | 7/2012 | Kaufmann et al. | 435/69.1 |
| 8,315,953 B1 * | 11/2012 | Hansen et al. | 705/319 |
| 8,478,527 B2 * | 7/2013 | Jakobson et al. | 701/533 |
| 8,645,366 B1 * | 2/2014 | Acharya | 707/723 |
| 8,682,805 B1 * | 3/2014 | Hansen et al. | 705/319 |
| 8,768,070 B2 * | 7/2014 | Gelfand et al. | 382/224 |
| 2008/0268876 A1 * | 10/2008 | Gelfand et al. | 455/457 |
| 2009/0111487 A1 * | 4/2009 | Scheibe | 455/456.6 |
| 2009/0281719 A1 * | 11/2009 | Jakobson | 701/201 |
| 2009/0324103 A1 * | 12/2009 | Gelfand et al. | 382/224 |
| 2010/0174709 A1 * | 7/2010 | Hansen et al. | 707/728 |
| 2010/0262658 A1 | 10/2010 | Mesnage | |
| 2010/0312644 A1 | 12/2010 | Borgs | |
| 2011/0035329 A1 | 2/2011 | Delli Santi | |
| 2011/0238762 A1 | 9/2011 | Soni | |
| 2011/0264370 A1 * | 10/2011 | Jakobson et al. | 701/209 |

FOREIGN PATENT DOCUMENTS

| | | | |
|---|---|---|---|
| JP | 2009104450 A | 5/2009 | |
| WO | 2010141656 A1 | 12/2010 | |

OTHER PUBLICATIONS

Bandara, Udana, et al., "Tagciti: A Practical Approach for Location-Aware and Socially-Relevant Information Creation and Discovery for Mobile Users", IEEE ISWCS, 2008, pp. 118-122.

(Continued)

*Primary Examiner* — Baoquoc N To
(74) *Attorney, Agent, or Firm* — Bracewell & Giuliani LLP

(57) ABSTRACT

Provided are systems, methods, and computer-readable media for providing search results having contacts from a user's social graph are provided herein. A search query is received from a user of client computer, and a point of interest responsive to the search query is determined. A person associated with the point of interest is identified, and a relationship in a social graph between the person and the user is identified. A search result that includes the point of interest and information about the person in the user's social graph associated with the point of interest is generated, and the search result is transmitted over a network to the client computer.

20 Claims, 6 Drawing Sheets

(56) References Cited

OTHER PUBLICATIONS

Copending U.S. Appl. No. 13/665,644, entitled "Methods and Computer-Readable Media for Providing Recommended Entities Based on a User's Social Graph," by Sebastian Dorner filed Oct. 31, 2012.

Copending U.S. Appl. No. 13/745,053, entitled "Systems, Methods and Computer-Readable Media for Providing Recommended Entities Based on a User's Social Graph," by Mat Balez filed Jan. 18, 2013.

* cited by examiner

SYSTEMS, METHODS, AND COMPUTER-READABLE MEDIA FOR PROVIDING SEARCH RESULTS HAVING CONTACTS FROM A USER'S SOCIAL GRAPH

BACKGROUND OF THE INVENTION

1. Field of the Invention

This invention relates generally to computer-implemented searching of the Internet and, more particularly to providing search results with information from a user's social graph.

2. Description of the Related Art

The Internet is useful for a variety of purposes. For example, users may use the Internet to perform computer-implemented searches, such as to locate and retrieve information about businesses or other entities located in a geographic area. Although information about such entities is generally available in some form, the information, and the presentation of the information, may be random and unstructured and may not present interesting information to a user. Additionally, the sources for such information are unknown to user, or the user may find the sources for such information to be unreliable or untrustworthy. Consequently, a user may be unable to easily determine entities that are of interest to the user. Moreover, the results of the search may not leverage information from a user's social graph, such as a social graph of a social networking service.

SUMMARY OF THE INVENTION

Various embodiments of systems, methods, and computer-readable media for providing search results having contacts from a user's social graph are provided herein. In some embodiments, a method for providing search results having a contact from a user's social graph is provided. The method includes receiving, by one or more processors, a search query from a user of a client computer and determining, by one or more processors, a point of interest responsive to the search query. The method further includes identifying, by one or more processors, a person associated with the point of interest and determining, by one or more processors, a relationship in a social graph between the person associated with the point of interest and the user. Finally, the method also includes generating, by one or more processors, a search result that includes the point of interest and information about the person in the user's social graph associated with the point of interest and transmitting over a network, by one or more processors, the search results to the client computer.

In some embodiments, a non-transitory tangible computer-readable storage medium having executable computer code stored thereon for providing search results having a contact from a user's social graph is provided. The computer code includes a set of instructions that causes one or more processors to perform the following: receiving, by one or more processors, a search query from a user of a client computer and determining, by one or more processors, a point of interest responsive to the search query. The computer code further includes a set of instructions that causes one or more processors to perform the following: identifying, by one or more processors, a person associated with the point of interest and determining, by one or more processors, a relationship in a social graph between the person associated with the point of interest and the user. Additionally, the computer code further includes a set of instructions that causes one or more processors to perform the following: generating, by one or more processors, a search result that includes the point of interest and information about the person in the user's social graph associated with the point of interest and transmitting over a network, by one or more processors, the search results to the client computer.

Additionally, in some embodiments a system for providing search results having a contact from a user's social graph is provided. The system includes one or more processors and a non-transitory tangible memory accessible by the one or more processors and having executable computer code stored thereon. The computer code includes a set of instructions that causes one or more processors to perform the following: receiving, by one or more processors, a search query from a user of a client computer and determining, by one or more processors, a point of interest responsive to the search query. The computer code further includes a set of instructions that causes one or more processors to perform the following: identifying, by one or more processors, a person associated with the point of interest and determining, by one or more processors, a relationship in a social graph between the person associated with the point of interest and the user. Additionally, the computer code further includes a set of instructions that causes one or more processors to perform the following: generating, by one or more processors, a search result that includes the point of interest and information about the person in the user's social graph associated with the point of interest and transmitting over a network, by one or more processors, the search results to the client computer.

Figure 1:
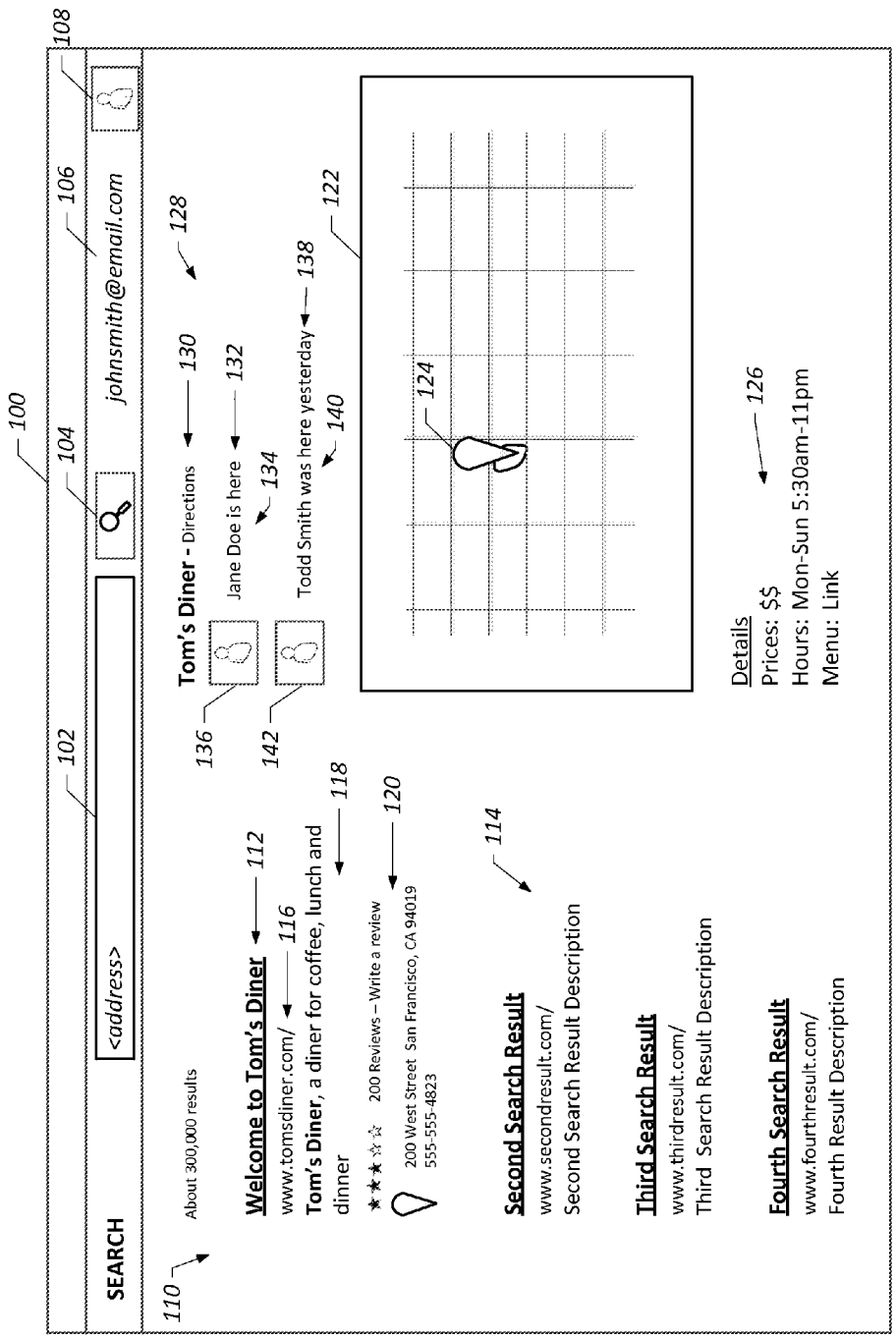
FIG. 1 is a diagram that depicts a screenshot illustrating the display of search results having associated persons from a user's social graph in accordance with an embodiment of the present invention.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

As discussed in more detail below, provided in some embodiments are systems, methods, and computer-readable media for providing search results having contacts from a user's social graph. In some embodiments, a point of interest (e.g., one or more points of interest) from the search results is displayed with associated persons from a user's social graph. The association is based on the current presence or past presence of a contact from the social graph at the point of interest. The presence of a contact is obtained from a location-based social networking service, such as by "check-ins" of contacts at a point of interest, location-aware services that monitor the location of contacts, or other indicators of a contact's presence at a point of interest. Such services may only provide a contact's location if the contact has agreed to share his or her location with the service or with the user conducting the search. Additionally, the previous presences of contacts at a point of interest, the frequency of presences of contacts, and other information may be shown in the search results.

Additionally, in other embodiments, a message authored by a contact and associated with the point of interest is displayed with the search results. The contact-authored message may include a post on a social networking service, a review, a microblog or other contact-authored message. The contact-authored message is annotated to a contact's status and image (e.g., profile picture) displayed with the point of interest. A user can select the name, picture, or the contact-authored message to retrieve additional details about the contact or retrieve additional contact-authored messages.

FIG. 1 depicts a screenshot 100 illustrating the display of search results having associated persons from a user's social graph in accordance with an embodiment of the present invention. The illustrated screenshot 100 is from a display on a client computer, such as the computer described below in FIG. 6. The illustrated screenshot 100 and displayed information is displayed by an application executed on the computer, such as a browser (e.g., Google Chrome™) displaying a web application. In other embodiments, the information depicted in screenshot 100 is displayed by an interactive map application executing on a portable computer (e.g., Google Maps™). The screenshot 100 depicts a text field 102 (e.g., a search field of a webpage) and a search button 104. A user executes a search by entering search terms in the text field 102 and selecting (e.g., clicking) the search button 104.

After executing a search, search results 110 are displayed in the browser or other application. The search results 110 may include multiple items that match the search criteria, and points of interest are highlighted or otherwise visually distinguished in the search results 110. For example, as shown in FIG. 1, the search results 110 include a point of interest 112 (e.g., "Tom's Diner") and other items 114. The point of interest 112 is displayed with additional information about the point of interest, such as a website 116 (e.g., "www.tomsdiner.com/"), descriptive information 118 such as a descriptions, ratings, links to reviews, etc. (e.g., "Tom's Diner, a diner for coffee, lunch and dinner") and contact information 120, such as an address (e.g., "200 West Street San Francisco, Calif. 94019") and phone number (e.g., "555-555-4823"). The non-highlighted items 114 of the search results 110 are displayed with only some of this information. The browser or other application also displays an interactive map 122, and the location of the point of interest 112 is displayed on the interactive map 122 and indicated by an icon 124. Additionally, more details 126 regarding the point of interest 112 are displayed below the interactive map 122, such as price, hours, and links to menus. It should be appreciated that, in some embodiments, a plurality of points of interest will be responsive to the search query and provided in the search results 110.

As mentioned above, associated persons 128 from a user's social graph are displayed with the search results 110. The associated persons 128 are displayed based on associations with the points of interest of the search results, such as the point of interest 112. For example, as described below, the associated persons 128 are based on the current presence of contacts from a user's social graph. The associated persons 128 are identified by a title 130 indicating the point of interest that the associated persons 128 are associated with. As shown in FIG. 1, the title 130 identifies the point of interest 112 (e.g., "Tom's Diner") from the search results 110.

The associated persons 128 include a first contact 132 having a current presence at the point of interest 112. The first contact 132 is identified with status text 134 (e.g., "Jane Doe is here") indicating the association between the point of interest 112 and the first contact 132. The first contact 132 is also displayed with a picture 136 associated with the contact 132, such as a profile picture from the contact's profile on a social networking service.

The associated persons 128 may include other contacts having similar associations or different associations that are useful to display to a user executing a search. For example, as also shown in FIG. 1, a second contact 138 may also be displayed with status text 140 (e.g., "Todd Smith was here yesterday") indicating the association between the highlighted entry 112 and the second contact 138. Here again, the second contact 138 is also displayed with an associated picture 142, such as a profile picture from the contact's profile on a social networking service. In the embodiment illustrated in FIG. 1, the association between the second contact 136 and the point of interest 112 is based on a past presence of the contact 138 at the point of interest. For example, the second contact 138 may have "checked-in" or had an otherwise indicated presence at the point of interest 112 the day before execution of the current search query (e.g., "yesterday). In other embodiments, the associated persons 128 may include the past presences of a contacts at the point of interest for various time periods before execution of the current search query, such as 1 day before (e.g., yesterday), 2 days before, 3 days before, 4 days before, and so on. Additionally, in embodiments the association includes the aggregate presence of a contact at the point of interest over such time periods, such as a contact having multiple presences at the point of interest over a 2 day period, 3-day period, 4-day period, 5-day period, 6-day period, 1 week period, or greater period. In such embodiments, for example, the status text 134 includes an indicator of the aggregate presence, such as "Todd Smith comes here often."

Figure 2:
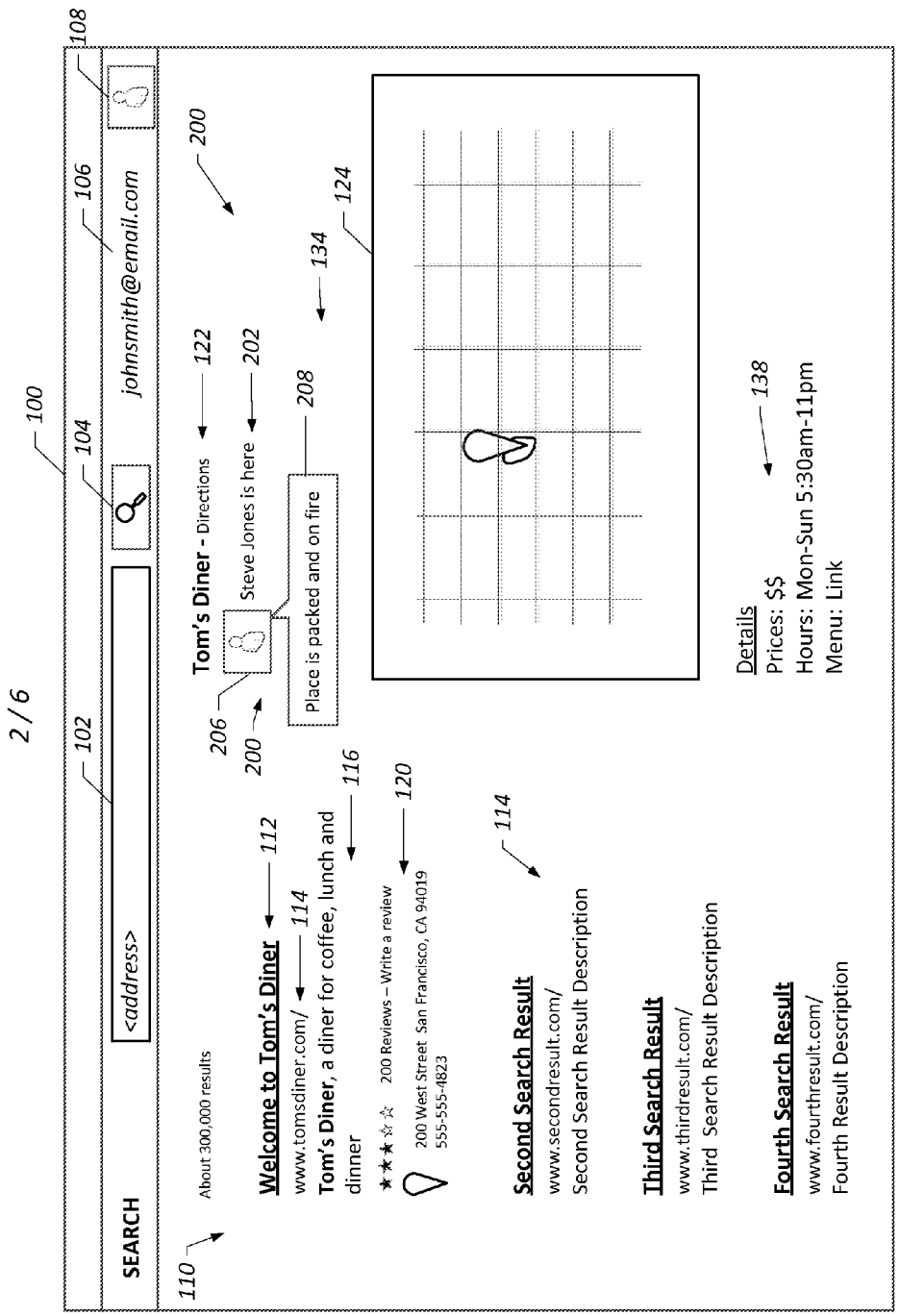
FIG. 2 is a diagram that depicts the screenshot of FIG. 1 illustrating the display of search results having associated persons from a user's social graph in accordance with another embodiment of the present invention.

In some embodiments, the associated persons 128 include a message generated by a contact associated with the point of interest. FIG. 2 depicts the screenshot 100 illustrating associated persons 128 with contact-authored messages in accordance with an embodiment of the present invention. As mentioned above, the screenshot 100 is from a display on a client computer, such as the computer described below in FIG. 6, and is displayed by an application executed on the computer, such as a browser (e.g., Google Chrome™) displaying a web application, or other applications. As also mentioned above, the screenshot 100 depicts the text field 102, the search button 104, search results 110, the point of interest 112, and various other elements described in detail above with regard to FIG. 1.

In the embodiment depicted in FIG. 2, associated persons 200 include a contact 202 having a current presence at the point of interest 112. The first contact 202 is identified with text 204 ("Steve Jones is here") indicating the association between the point of interest 112 and the contact 202. The contact 202 is also displayed with an associated picture 206 such as a profile picture from a social networking service.

Additionally, in the embodiment depicted in FIG. 2, the contact 202 is annotated with contact-authored message 208. For example, the contact-authored message 208 ("Place is packed and on fire") is displayed next to the contact 202 and depicted as originating from the contact 202. The contact-authored message 208 is generated from any suitable mechanism, such as posts on a social networking service, microblogging services (e.g., Twitter), or other services that enable a contact to author messages. In some embodiments, the message includes signals other than text generated by a contact, such as a "Like" or "+1" recommendation of a point of interest.

As will be appreciated, the messages generated by such services may be location-tagged (also referred to as "geotagged") with location data. If the location data matches the point of interest 112, the contact-authored message 208 is annotated to the contact 202 and displayed with the associated persons 200 next to the search results 110. In some embodiments, multiple contact-authored message items are ranked, and the highest ranked contact-authored message is selected as the displayed contact-authored message 208. Additionally, the context-generated message is formatted for display based on length, number of words, and any other suitable factors.

Figure 3:
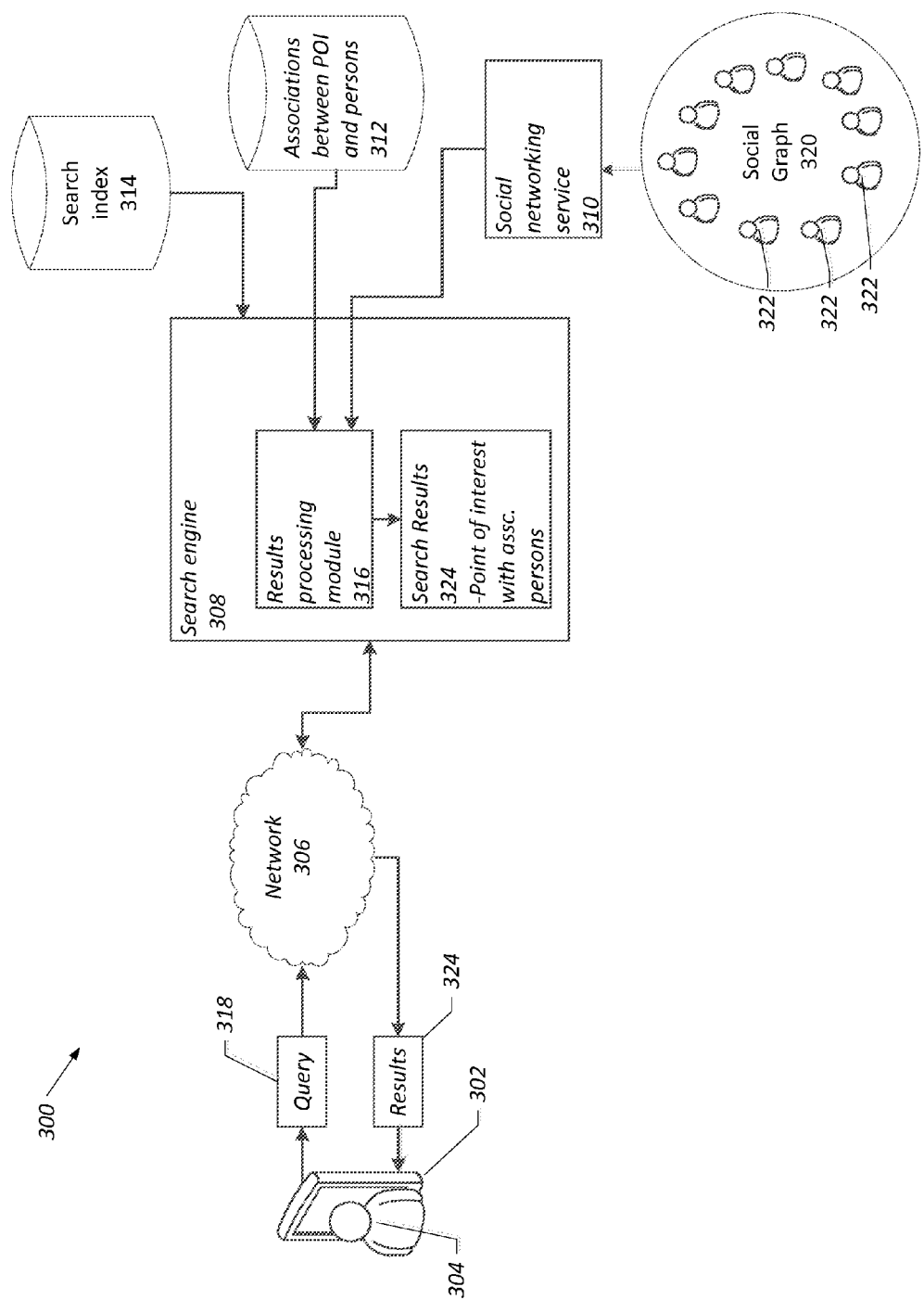
FIG. 3 is a block diagram that illustrates a system for determining search results having associated persons from a user's social graph in accordance with an embodiment of the present invention.

FIG. 3 is a diagram that illustrates a system 300 for determining search results having associated persons from a user's social graph in accordance with an embodiment of the present invention. As shown in FIG. 1, the system 300 includes a client computer 302 and a user 304 of the client computer 302. The system 300 also includes a network 306, a search engine 308, and a social networking service 310. In some embodiments, the system 300 may include multiple social networking services. The system 300 also includes a data structure 312 (e.g., a database, an associated array, or other data repository) that includes the associations between points-of-interest (POI) and persons. For example, for a given POI, the persons associated with the POI (e.g., checked-in to the POI) is stored in the data structure 312. In some embodiments, the data structure 312 is generated by and a part of the social networking service 310. In other embodiments, the data structure 312 is generated by a separate component, such as another service, that is included in the system 300.

The client computer 302, the search engine 308, the social networking service 310, and other components of the system 300 may communicate with each other over the network 306. For example, the client computer 302 may transmit data to and receive data from the search engine 308, and the social networking service 310. In some embodiments, the client computer 302 may include thick-clients, thin-clients, or both. The client computer 302 may include, for example, smart-phones, tablet computers, laptop computers, desktop computers, etc. In some embodiments, the system 300 may include multiple client computers 302. Additionally, some embodiments may include a proxy, gateway, or other component located between the client computer 302 and other components of the system 300. For example, a router or mobile proxy computer is located between the client computer 302 and the network 306. In other embodiments, the client computer 302 may access the network 306, the search engine 308, or other components of the system 300 via a service provided by another entity.

The network 306 may include any element or system that facilitates communications between the components of system 300. The network 306 may include an electronic communication network, may include any suitable network, such as the Internet, an intranet, a local area network (LAN), a wide area network (WAN), a cellular communications network or any other suitable network, and may be a wireless or wired network. The network 306 may facilitate data exchange by way of packet switching using the Internet Protocol (IP). Network 306 may facilitate wired and/or wireless connectivity and communication. The network 306 may include a single network or combination of networks (e.g., the Interest and a cellular communications network) that facilitate communication between the components of system 300. In some embodiments, the components of the system 300 may each be associated with a given IP. The IP address may include an IPv4 IP address, an IPv6 IP address or the like. It should be appreciated that the client computer 302 and other components of the system 300 may communicate over different networks separately and simultaneously. For example, the client computer 102 may communicate over both a wireless Ethernet network and a cellular network.

The search engine 308, the social networking service 310, and the data structure 312 may each be implemented on a single server (in a discrete hardware component or as a virtual server) or multiple servers. Such servers may include web servers, application servers, or other types of servers. The servers may include, for example, computers arranged in any physical and virtual configuration, such as computers in one or more data processing centers, a distributed computing environment, or other configuration. Such configurations may use the network 306 for communication or may communicate over other networks The search engine 308 may include or be in communication with a search index 314 that provides indexed data for performing searches. The search engine 308 includes a results processing module 316 that may determine search results based on a search query 318 received from the client computer 302. The social networking service 310 includes a social graph 320 for the user 304, such as one or more contacts 322 having a relationship with the user as defined by the social networking service 310. The social graph 320 may be referred to as "friends" of a user. In some embodiments, the social graph 320 may be or may include subsets of contacts, e.g., subsets of friends having a particular relationship to the user of the client computer 302. The social graph 320 may be defined independently of the other components of the system, such as the search engine 310. For example, the external social graph 320 of the social networking service 310 may be separate and independent relative to the other components of the system 300.

The user 302 may use the client computer 304 to search for points of interest. In embodiments, such searches include queries with a local intent, e.g., "Pizza NYC", "Pizza Hut, "Restaurants," etc. In such embodiments, the search query 318 is transmitted from the client computer 302 and over the network 306 to the search engine 308. In response, the search engine 308 may determine and transmit search results 324 having, for example, point of interests responsive to a search query. As used herein, the term "point of interest" refers to a private or public entity having a physical location, such as a business (e.g., restaurant, bar, store, etc.), a public facility (e.g., a park, library, etc.), a government office (e.g., Department of Public Safety (DPS) office, courthouse), etc. As described in further detail below, the search results 324 may include persons from a user's social graph, such as the social graph 320 of the social networking service 310, that are associated with the point of interest. As mentioned above, the search results 324 may include one or more highlighted results having persons and information from one or more contacts 322 of the social graph 320. For example, as described above, if one of the contacts 322 has an association with a point of interest in the search results 324, the contact and information are provided with the search results and displayed with a highlighted point of interest. Additionally, as mentioned above, the contact-authored message is obtained and provided with the search results. For example, posts, reviews, or other content-generated messages generated by the user via the social networking service are obtained and included with the location-based contact when displayed with the search results 324. In some embodiments, search results may not include highlighted or otherwise distinguished points of interest. For example, such search results may include associated persons in line with one or multiple points of interest included in the search results.

Figure 4:
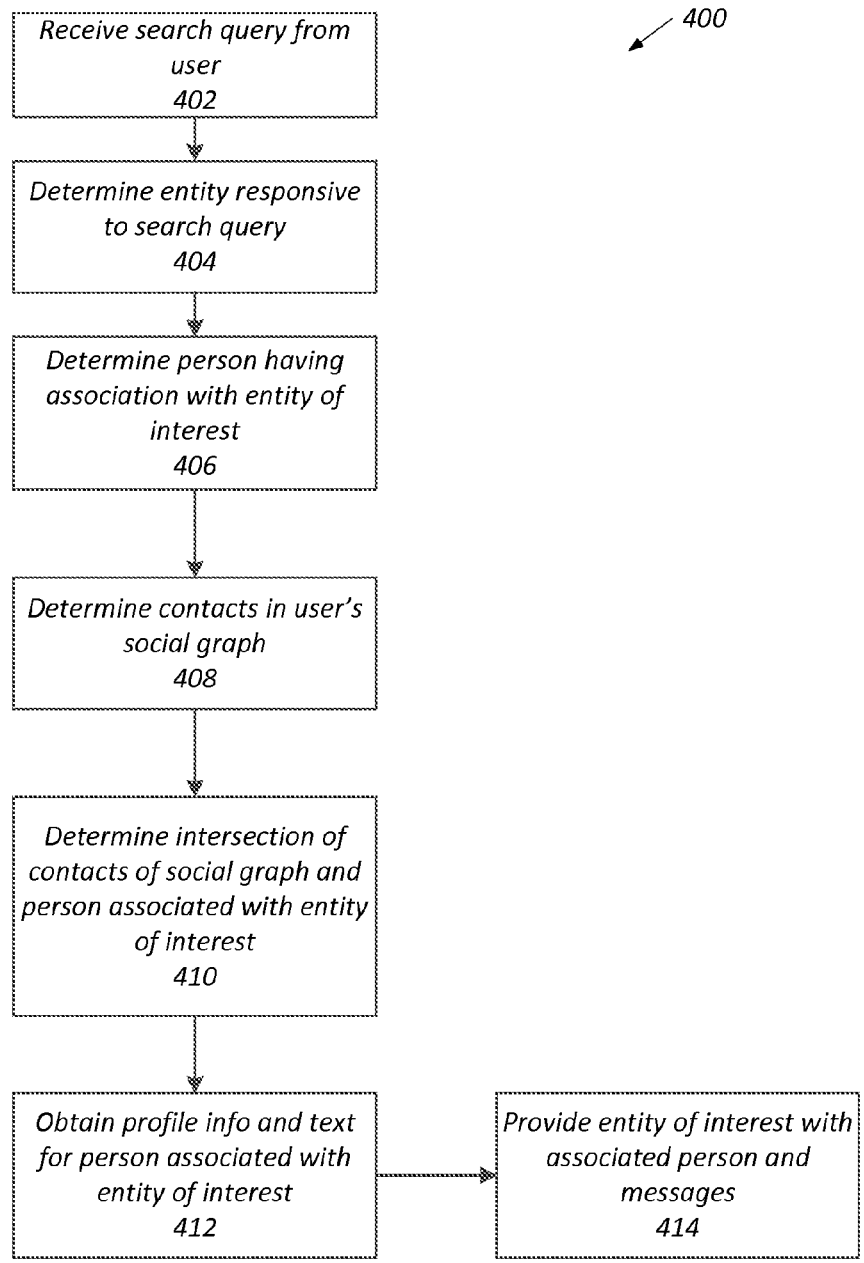
FIG. 4 is a block diagram of a process for providing search results having associated persons from a user's social graph in accordance with an embodiment of the present invention.

FIG. 4 depicts a process 400 for determining search results having associated persons from a user's social graph in accordance with an embodiment of the present invention. Some or all steps of the process 400 may be implemented as executable computer code stored on a non-transitory tangible computer-readable storage medium and executed by one or more processors of a special-purpose machine, e.g., a computer programmed to execute the code. Initially, a search query is received from a user (block 402). In some embodiments, the search query is evaluated to categorize the search query and determine if the search results are appropriate for including associated persons (e.g., if the search results are entities having a location). Next, a point of interest responsive to the search query is determined (block 404). It should be appreciated that, in some embodiments, a plurality of points of interest will be responsive to the search query. In such embodiments, the points of interest responsive to the search may include or be assigned a ranking and the highest ranked point of interest (or multiple of points of interest) is selected.

Next, a person having an association with the point of interest is determined (block 406). As described above, the association is based on a current presence, previous presence, or frequent presence of the person at the point of interest. The presences may be determined from a service that provides "check-ins" and "check-outs" at entities or a location-based service that identifies the location of a person at a point of interest. After determining the person associated with the point of interest, the contacts in a social graph associated with the user are determined (block 408). For example, in some embodiments, the social graph is a social graph of a social networking service.

After determining the contact of the user's social graph, the intersection between the contacts of the social graph and the person associated with the point of interest are determined (block 410). As noted above, the social graph may include all contacts having a relationship to the user as defined in the graph or subsets of such contacts having a particular relationship to the user. The intersection indicates if a contact from the social graph is associated with the point of interest, such as a contact having a current or past presence at the point of interest. Next, profile information and contact-authored message are obtained for the person contact associated with the point of interest (block 412). Finally, the point of interest and associated person are provided as search results (block 414), such as by generating a webpage similar to those described above in FIGS. 1 and 2. As described above, the associated person is displayed with a profile picture, status text, and contact-authored message associated with the point of interest.

As noted above, it should be appreciated that a plurality of points of interest will be responsive to the search query. Furthermore, or each point of interest, a plurality of persons will be associated with the point of interest. Accordingly, for each point of interest and for each person associated with that point of interest, the process 400 is executed to determine whether that person is related to the user via the user's social graph.

Figure 5:
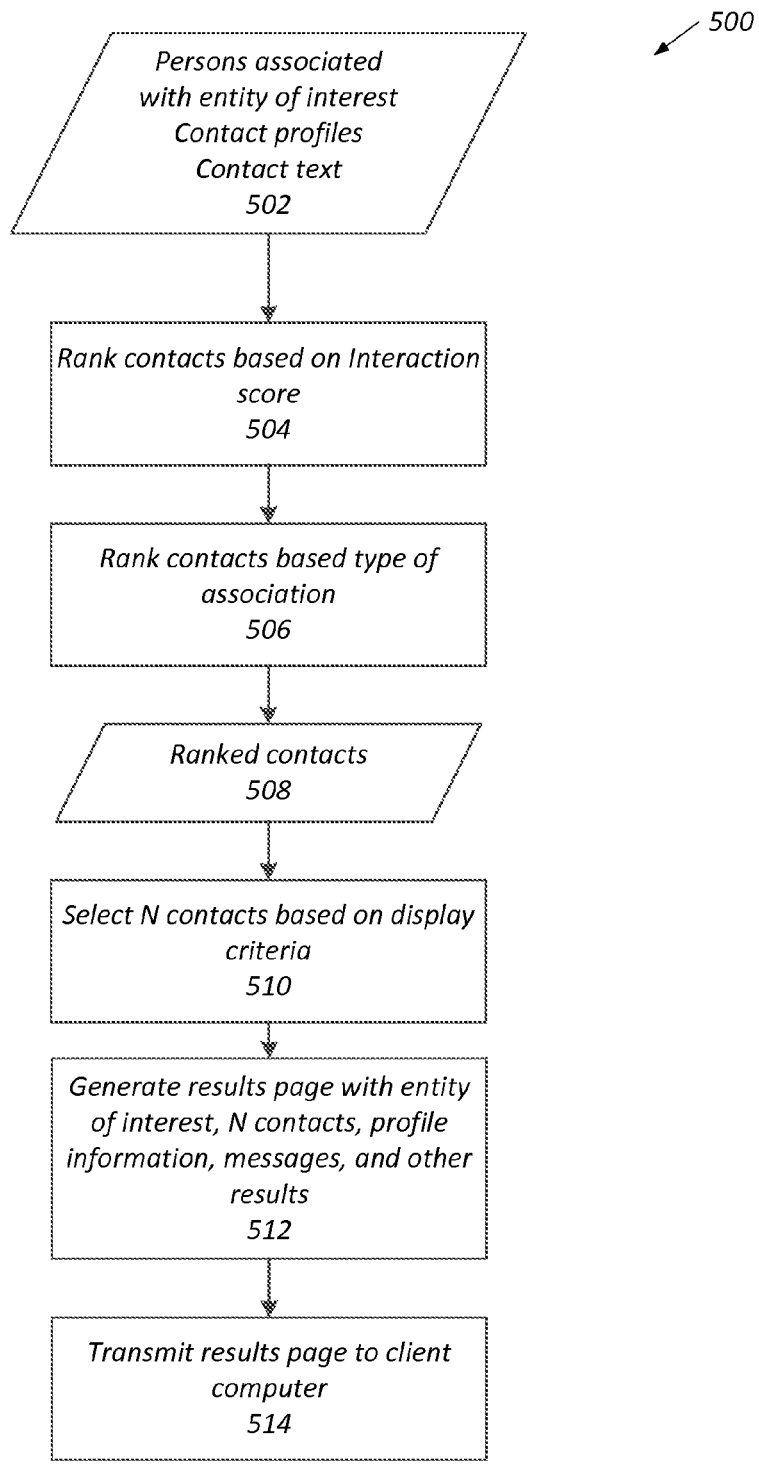
FIG. 5 is a block diagram of a process for determining associated persons from a user's social graph in accordance with an embodiment of the present invention.

FIG. 5 depicts a process 500 for determining associated persons from a user's social graph in accordance with an embodiment of the present invention. Some or all steps of the process 500 may be implemented as executable computer code stored on a non-transitory tangible computer-readable storage medium and executed by one or more processors of a special-purpose machine, e.g., a computer programmed to execute the code. Initially, contacts associated with a point of interest, contact profiles, and contact-authored message (block 502) are determined, such as by the process described above in FIG. 4. Next, the associated contacts are ranked based on an interaction score between the contacts and a user (block 504). Additionally, in some embodiments, the contacts are also ranked based on the type of association (block 506), such as whether the association is a current presence, past presence, frequent presence, and so on. The rankings may produce a ranked list of contacts 508.

Next, a number of contacts are selected from the ranked list of contacts 508 based on display criteria (block 510). The display criteria may include limitations on the display area for the associated persons, such that only one, two, three, four, or greater than four contacts are displayed in the display area. A results webpage may then be generated having the point of interest, the selected contacts, the profile information (e.g., profile pictures), contact-authored message, and other entities matching the search query (block 512), such as a webpage similar to those described above in FIGS. 1 and 2. Finally, the generated results webpage is transmitted to the client computer of the user initiating the search query (block 514). By viewing the results webpage, the user is able to determine whether contacts from the user's social graph are currently present or have been present at the point of interest. Additionally, the contact-authored message from such persons provides the user with information about the point of interest that the user may find relevant based on the association with the contacts from the social graph.

Figure 6:
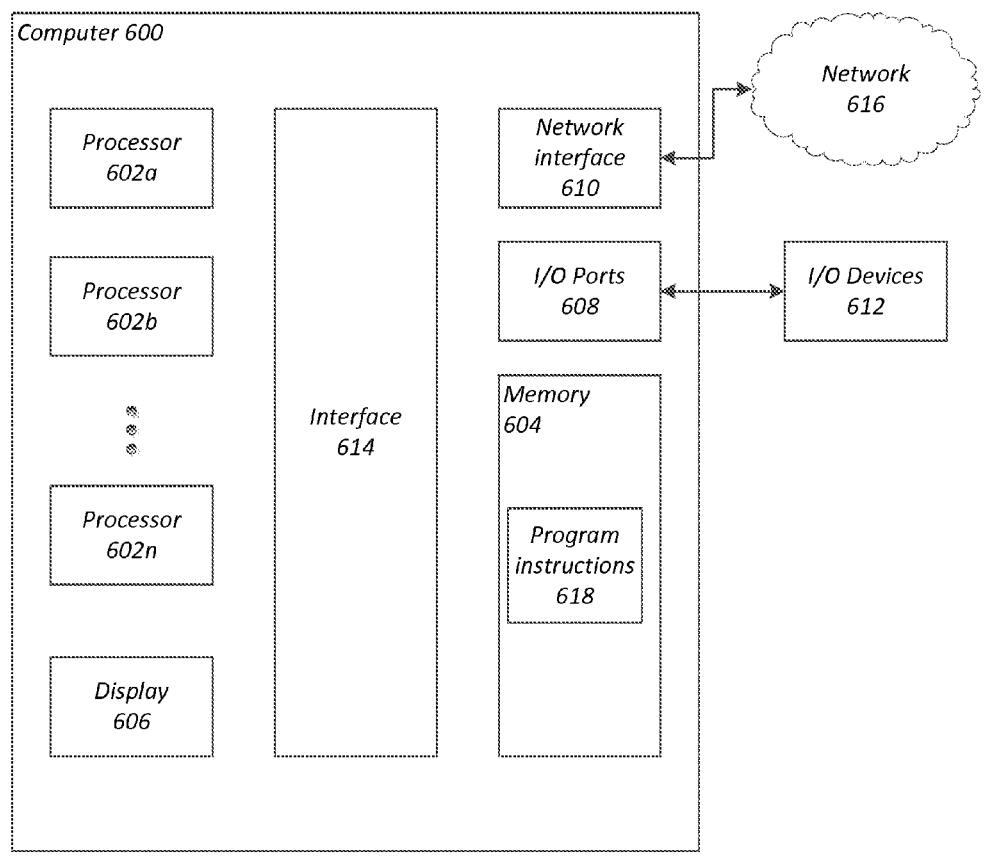
FIG. 6 is a block diagram of a computer in accordance with an embodiment of the present invention.

FIG. 6 depicts a computer 600 (e.g., a client computer, a server, etc.) in accordance with an embodiment of the present invention. Various portions or sections of systems and methods described herein include or are executed on one or more computers similar to computer 600 and programmed as special-purpose machines executing some or all steps of methods described above as executable computer code. Further, processes and modules described herein may be executed by one or more processing systems similar to that of computer 600.

The computer 600 may include various internal and external components that contribute to the function of the device and which may allow the computer 600 to function in accordance with the techniques discussed herein. As will be appreciated, various components of computer 600 may be provided as internal or integral components of the computer 600 or may be provided as external or connectable components. It should further be noted that FIG. 6 depicts merely one example of a particular implementation and is intended to illustrate the types of components and functionalities that may be present in computer 600. As shown in FIG. 6, the computer 600 may include one or more processors (e.g., processors 602a-602n) coupled to a memory 604, a display 606, I/O ports 608 and a network interface 610, via an interface 614.

Computer 600 may include any combination of devices or software that may perform or otherwise provide for the performance of the techniques described herein. For example, computer 600 may include or be a combination of a cloud-computing system, a data center, a server rack or other server enclosure, a server, a virtual server, a desktop computer, a laptop computer, a tablet computer, a mobile telephone, a personal digital assistant (PDA), a media player, a game console, a vehicle-mounted computer, or the like. The computer 600 may be a unified device providing any one of or a combination of the functionality of a media player, a cellular phone, a personal data organizer, a game console, and so forth. Computer 600 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

In addition, the computer 600 may allow a user to connect to and communicate through a network 616 (e.g., the Internet, a local area network, a wide area network, etc.) and to acquire data from a satellite-based positioning system (e.g., GPS). For example, the computer 600 may allow a user to communicate using e-mail, text messaging, instant messaging, or using other forms of electronic communication, and may allow a user to obtain the location of the device from the satellite-based positioning system, such as the location on an interactive map.

In one embodiment, the display 606 may include a liquid crystal display (LCD) or an organic light emitting diode (OLED) display, although other display technologies may be used in other embodiments. The display 606 may display a user interface (e.g., a graphical user interface). In accordance with some embodiments, the display 606 may include or be provided in conjunction with touch sensitive elements through which a user may interact with the user interface. Such a touch-sensitive display may be referred to as a "touch screen" and may also be known as or called a touch-sensitive display system.

The processor 602 may provide the processing capability required to execute the operating system, programs, user interface, and any functions of the computer 600. The processor 602 may receive instructions and data from a memory (e.g., system memory 604). The processor 602 may include one or more processors, such as "general-purpose" microprocessors, and special purpose microprocessors, such as ASICs. For example, the processor 602 may include one or more reduced instruction set (RISC) processors, such as those implementing the Advanced RISC Machine (ARM) instruction set. Additionally, the processor 602 may include single-core processors and multicore processors and may include graphics processors, video processors, and related chip sets. Accordingly, computer 600 may be a uni-processor system including one processor (e.g., processor 602*a*), or a multi-processor system including any number of suitable processors (e.g., 602*a*-602*n*). Multiple processors may be employed to provide for parallel or sequential execution of one or more sections of the techniques described herein. Processes, such as logic flows, described herein may be performed by one or more programmable processors executing one or more computer programs to perform functions by operating on input data and generating corresponding output.

The memory 604 (which may include one or more tangible non-transitory computer readable storage medium) may include volatile memory, such as random access memory (RAM), and non-volatile memory, such as ROM, flash memory, a hard drive, any other suitable optical, magnetic, or solid-state storage medium, or a combination thereof. The memory 604 may be accessible by the processor 602 and other components of the computer 600. The memory 604 may store a variety of information and may be used for a variety of purposes. The memory 604 may store executable computer code, such as the firmware for the computer 600, an operating system for the computer 600, and any other programs or other executable code necessary for the computer 600 to function. The executable computer code may include program instructions 618 executable by a processor (e.g., one or more of processors 602*a*-602*n*) to implement one or more embodiments of the present invention. For example, in some embodiments, processes 400 and 500 described above may each be implemented via executable computer code having program instructions, such as instructions 618. Instructions 618 may include modules of computer program instructions for implementing one or more techniques described herein with regard to various processing modules. Program instructions 618 may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, a subroutine. A computer program may or may not correspond to a file in a file system. A program may be stored in a section of a file that holds other programs or data (e.g., one or more scripts stored in a markup language document), in a single file dedicated to the program in question, or in multiple coordinated files (e.g., files that store one or more modules, sub programs, or sections of code). A computer program may be deployed to be executed on one or more computer processors located locally at one site or distributed across multiple remote sites and interconnected by a communication network. In addition, the memory 604 may be used for buffering or caching during operation of the computer 600. The memory 604 may also store data files such as media (e.g., music and video files), software (e.g., for implementing functions on computer 600), preference information (e.g., media playback preferences), wireless connection information (e.g., information that may enable media device to establish a wireless connection), telephone information (e.g., telephone numbers), and any other suitable data.

As mentioned above, the memory 604 may include volatile memory, such as random access memory (RAM). The memory 604 may also include non-volatile memory, such as ROM, flash memory, a hard drive, any other suitable optical, magnetic, or solid-state storage medium, or a combination thereof. The interface 614 may include multiple interfaces and may couple various components of the computer 600 to the processor 602 and memory 604. In some embodiments, the interface 614, the processor 602, memory 604, and one or more other components of the computer 600 may be implemented on a single chip, such as a system-on-a-chip (SOC). In other embodiments, these components, their functionalities, or both may be implemented on separate chips. The interface 614 may be configured to coordinate I/O traffic between processors 602*a*-602*n*, system memory 604, network interface 610, I/O devices 612, other peripheral devices, or a combination thereof. The interface 614 may perform protocol, timing or other data transformations to convert data signals from one component (e.g., system memory 604) into a format suitable for use by another component (e.g., processors 602*a*-602*n*). The interface 614 may include support for devices attached through various types of peripheral buses, such as a variant of the Peripheral Component Interconnect (PCI) bus standard or the Universal Serial Bus (USB) standard.

The computer 600 may also include an input and output port 608 to allow connection of additional devices, such as I/O devices 612. Embodiments of the present invention may include any number of input and output ports 608, including headphone and headset jacks, universal serial bus (USB) ports, Firewire or IEEE-1394 ports, and AC and DC power connectors. Further, the computer 600 may use the input and output ports to connect to and send or receive data with any other device, such as other portable computers, personal computers, printers, etc.

The computer 600 depicted in FIG. 6 also includes a network interface 610, such as a wired network interface card (NIC), wireless (e.g., radio frequency) receivers, etc. For example, the network interface 610 may receive and send electromagnetic signals and communicate with communications networks and other communications devices via the electromagnetic signals. The network interface 610 may include known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The network interface 610 may communicate with networks (e.g., network 616), such as the Internet, an intranet, a cellular telephone network, a wireless local area network (LAN), a metropolitan area network (MAN), or other devices by wireless communication. The communication may use any suitable communications standard, protocol and technology, including Ethernet, Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11a, IEEE 802.11b, IEEE 802.11g or IEEE 802.11n), voice over Internet Protocol (VoIP), Wi-MAX, a protocol for email (e.g., Internet message access protocol (IMAP) or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), Multimedia Messaging Service (MMS), Short Message Service (SMS), or any other suitable communication protocol.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implement method for providing search results having a contact from a user's social graph, comprising:
   receiving, by one or more processors, a search query from a user of a client computer;
   determining, by one or more processors, a point of interest responsive to the search query;
   identifying, by one or more processors, a person associated with the point of interest;
   determining, by one or more processors, a relationship in a social graph between the person associated with the point of interest and the user;
   generating, by one or more processors, a search result that includes the point of interest and information about the person in the user's social graph associated with the point of interest; and
   transmitting over a network, by one or more processors, the search results to the client computer.

2. The method of claim 1, wherein the person is associated with the point of interest because the person is at least one of: currently present at the point of interest, previously present at the point of interest within a predetermined period of time, or frequently present at the point of interest within a predetermined period of time.

3. The method of claim 1, wherein the information comprises a profile picture of the person obtained from a social networking service having the social graph.

4. The method of claim 1, wherein the information comprises a description of the association between the person and the point of interest.

5. The method of claim 1, comprising ranking the person relative to other persons in the social graph based on an interaction score between the user and the person, a type of the association with the point of interest, or a combination thereof.

6. The method of claim 1, wherein the point of interest comprises a restaurant, a bar, or a retail store.

7. The method of claim 1, comprising obtaining a message authored by the person and associated with the point of interest.

8. The method of claim 7, wherein the message is geotagged with a location of the point of interest.

9. The method of claim 7, wherein the search result includes the message authored by the person.

10. A non-transitory tangible computer-readable storage medium having executable computer code stored thereon for providing search results having a contact from a user's social graph, the computer code comprising a set of instructions that causes one or more processors to perform the following:
   receiving, by one or more processors, a search query from a user of a client computer;
   determining, by one or more processors, a point of interest responsive to the search query;
   identifying, by one or more processors, a person associated with the point of interest;
   determining, by one or more processors, a relationship in a social graph between the person associated with the point of interest and the user;
   generating, by one or more processors, a search result that includes the point of interest and information about the person in the user's social graph associated with the point of interest; and
   transmitting over a network, by one or more processors, the search results to the client computer.

11. The non-transitory tangible computer-readable storage medium of claim 10, wherein the person is associated with the point of interest because the person is at least one of: currently present at the point of interest previously present at the point of interest within a predetermined period of time, or frequently present at the point of interest within a predetermined period of time.

12. The non-transitory tangible computer-readable storage medium of claim 10, wherein the information comprises a profile picture of the person obtained from a social networking service having the social graph.

13. The non-transitory tangible computer-readable storage medium of claim 10, wherein the information comprises a description of the association between the person and the point of interest.

14. The non-transitory tangible computer-readable storage medium of claim 10, the computer code further comprising a set of instructions that causes one or more processors to perform the following: ranking the person relative to other persons in the social graph based on an interaction score between the user and the person, a type of the association with the point of interest, or a combination thereof.

15. The non-transitory tangible computer-readable storage medium of claim 10, wherein the point of interest comprises a restaurant, a bar, or a retail store.

16. A system for providing search results having a contact from a user's social graph, the system comprising:
   one or more processors,
   a non-transitory tangible memory accessible by the one or more processors and having executable computer code stored thereon, the computer code comprising a set of instructions that causes one or more processors to perform the following:
      receiving, by one or more processors, a search query from a user of a client computer;
      determining, by one or more processors, a point of interest responsive to the search query;
      identifying, by one or more processors, a person associated with the point of interest;
      determining, by one or more processors, a relationship in a social graph between the person associated with the point of interest and the user;
      generating, by one or more processors, a search result that includes the point of interest and information about the person in the user's social graph associated with the point of interest; and
      transmitting over a network, by one or more processors, the search results to the client computer.

17. The system of claim 16, wherein the person is associated with the point of interest because the person is at least one of: currently present at the point of interest, previously present at the point of interest within a predetermined period of time, or frequently present at the point of interest within a predetermined period of time.

18. The system of claim 16, wherein the information comprises a profile picture of person obtained from a social networking service having the social graph.

19. The system of claim 16, wherein the information comprises a description of the association between the person and the point of interest.

20. The system of claim 16, the computer code further comprising a set of instructions that causes one or more processors to perform the following: ranking the person relative to other persons in the social graph based on an interaction score between the user and the person, a type of the association with the point of interest, or a combination thereof.

* * * * *